(12) United States Patent
Sakimura et al.

(10) Patent No.: US 9,950,303 B2
(45) Date of Patent: Apr. 24, 2018

(54) METHOD FOR PRODUCTION OF HOLLOW PARTICLE

(71) Applicant: Konica Minolta, Inc., Tokyo (JP)

(72) Inventors: Tomoo Sakimura, Hino (JP); Kunihiro Ogura, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 197 days.

(21) Appl. No.: 14/709,684

(22) Filed: May 12, 2015

(65) Prior Publication Data

US 2015/0328614 A1 Nov. 19, 2015

(30) Foreign Application Priority Data

May 14, 2014 (JP) ................................ 2014-100393

(51) Int. Cl.
*B01J 13/06* (2006.01)
*B01J 13/18* (2006.01)
*B01J 13/14* (2006.01)

(52) U.S. Cl.
CPC ............ *B01J 13/185* (2013.01); *B01J 13/14* (2013.01)

(58) Field of Classification Search
CPC ........... B01J 13/06; B01J 13/185; B01J 13/14
USPC ................. 264/4.1, 4.3, 4.32, 4.33, 4.6, 4.7
See application file for complete search history.

(56) References Cited

U.S. PATENT DOCUMENTS

| 4,798,691 A * | 1/1989 | Kasai ................... B01J 13/185 264/4.7 |
| 5,972,508 A * | 10/1999 | Boeckh ................... B01J 13/14 427/213.3 |
| 6,190,767 B1 * | 2/2001 | Ishikawa ................. C08F 20/28 428/355 AC |
| 6,375,872 B1 * | 4/2002 | Chao ....................... B01J 13/02 264/4.1 |
| 6,849,591 B1 * | 2/2005 | Boeckh ................ C11D 3/3761 510/101 |

FOREIGN PATENT DOCUMENTS

JP 2012201825 A 10/2012

* cited by examiner

*Primary Examiner* — Timothy Kennedy
(74) *Attorney, Agent, or Firm* — Lucas & Mercanti, LLP

(57) ABSTRACT

Provided is a method for the production of a hollow particle, which can easily produce a hollow particle having plural spaces formed inside. The method for the production of a hollow particle is a method for the production of a hollow particle having plural spaces inside thereof, which comprises dispersing an oil-phase liquid prepared by dissolving or dispersing a polymerizable monomer and an oil-soluble polymerization initiator having polymerization initiation ability for the polymerizable monomer in a hydrophobic solvent, in an aqueous medium containing a water-soluble polymerization initiator having polymerization initiation ability for the polymerizable monomer, to form an oil droplet; and applying the oil-soluble polymerization initiator and the water-soluble polymerization initiator at the same time to the polymerizable monomer, and polymerizing the polymerizable monomer, to form a shell dividing plural spaces in a particle.

12 Claims, 2 Drawing Sheets

METHOD FOR PRODUCTION OF HOLLOW PARTICLE

CROSS-REFERENCE TO RELATED APPLICATION

This application is based on Japanese Patent Application No. 2014-100393 filed on May 14, 2014, the contents of which are incorporated herein by reference.

BACKGROUND

1. Technical Field

The present invention relates to a method for the production of a hollow particle having plural spaces formed inside thereof.

2. Description of Related Art

Hollow particles with a dense shell on the surface having a single spherical space or consecutive minute spaces formed inside thereof, have been developed as a functional member for providing thermal insulation, lightweight property and the like. The hollow particles can exhibit higher effects on thermal insulation and lightweight property as the hollowness is higher, but as the hollowness is higher, strength of the shell decreases. Thus, hollowness may not be obtained in some cases because dense shells cannot be formed on the surface in the molding of the particles, or the hollowness may be lost in the use of the produced hollow particles due to shell damage and the like.

In order to solve such problems, hollow particle having fractionated plural spaces, but not a single spherical space nor consecutive spaces, formed inside have been proposed.

For the hollow particle having plural spaces formed inside thereof, strength of the hollow particle increase by the presence of partitions dividing each space, and further even if a part of the surface wall exposed to the surface is damaged, loss of hollowness is limited to the part.

As a method of producing such hollow particle, for example, a method which comprises forming resin particles for a shell from a foaming material, and then foaming the resin particles (for example, see JP-A-2012-201825).

SUMMARY

However, such production method has a problem in that the production processes are complicated. In addition, such production method has restriction that a resin material having mechanical strength to foaming has to be used, and the like.

The present invention was made based on the above situations, and an object thereof is to provide a method for the production of a hollow particle, which makes it possible to easily produce hollow particle having plural spaces formed inside thereof.

To achieve at least one of the above-mentioned objects, a method for the production of a hollow particle reflecting one aspect of the present invention is a method for the production of a hollow particle having plural spaces inside thereof, the method including:

dispersing an oil-phase liquid prepared by dissolving or dispersing a polymerizable monomer and an oil-soluble polymerization initiator having polymerization initiation ability for the polymerizable monomer in a hydrophobic solvent, in an aqueous medium containing a water-soluble polymerization initiator having polymerization initiation ability for the polymerizable monomer, to form an oil droplet; and applying the oil-soluble polymerization initiator and the water-soluble polymerization initiator at the same time to the polymerizable monomer, and polymerizing the polymerizable monomer, to form a shell dividing plural spaces in a particle.

In the method for the production of a hollow particle of the present invention, it is preferable that the polymerizable monomer include at least a multifunctional polymerizable monomer.

The method for the production of a hollow particle of the present invention preferably includes polymerizing the polymerizable monomer in an aqueous medium, and then replacing the hydrophobic solvent filled up into the space with the aqueous medium, and then drying the particle.

BRIEF DESCRIPTION OF THE DRAWINGS

FIG. 1A is a schematic diagram illustrating a state wherein an oil droplet is dispersed in an aqueous medium; FIG. 1B is a schematic diagram illustrating a state wherein internal space of the hollow particle is filled up with a hydrophobic solvent; FIG. 1C is a schematic diagram illustrating a state wherein internal space of the hollow particle is filled up with an aqueous medium; and FIG. 1D is a schematic diagram illustrating a state wherein internal space of the hollow particle is filled up with air.

DETAILED DESCRIPTION

Hereinafter, the present invention will be described in details. In the Description, "X to Y" showing a range indicates to be equal to or higher than X and equal to or lower than Y. Also, operation and measurement of physical properties or the like is performed at room temperature (20 to 25° C.)/a relative humidity of 40 to 50%, unless otherwise specified.

[Method for the Production of a Hollow Particle]

The method for the production of a hollow particle of the present invention is a method for the production of a hollow particle having internal spaces consisting of plural spaces inside thereof, the method including dispersing an oil-phase liquid prepared by dissolving or dispersing a polymerizable monomer and an oil-soluble polymerization initiator having polymerization initiation ability for the polymerizable monomer in a hydrophobic solvent, in an aqueous medium containing a water-soluble polymerization initiator having polymerization initiation ability for the polymerizable monomer, to form an oil droplet; and applying the oil-soluble polymerization initiator and the water-soluble polymerization initiator at the same time to the polymerizable monomer, and polymerizing the polymerizable monomer, to form a shell dividing plural spaces in a particle. According to the method for the production of a hollow particle of the present invention, by applying an oil-soluble polymerization initiator and a water-soluble polymerization initiator at the same time to a polymerizable monomer in an oil droplet and polymerizing the polymerizable monomer, shells dividing plural spaces are formed, and thus hollow particle having plural spaces formed inside thereof can be easily produced.

Figure 1A:
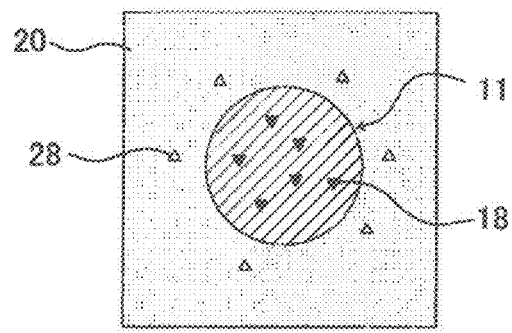
FIGS. 1A to 1D are a schematic diagram illustrating a method for the production of a hollow particle of the present invention.
Figure 1B:
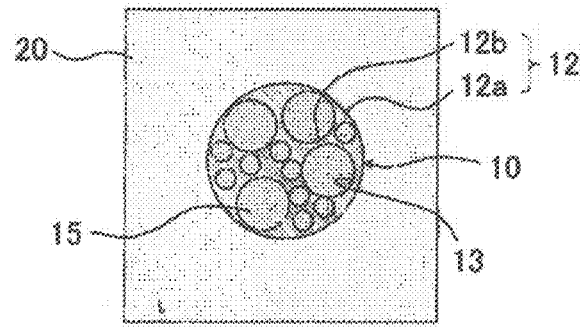
Figure 1C:
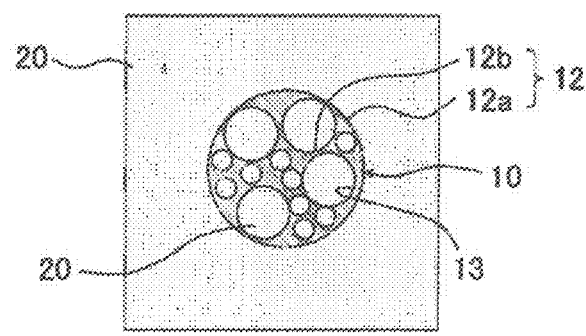
Figure 1D:
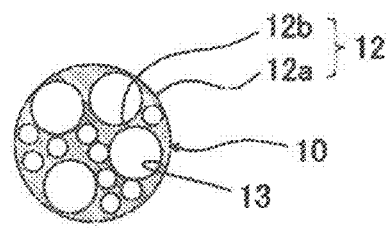

Specifically, as shown in FIG. 1D, the hollow particle 10 has a shell 12 that includes a surface wall 12a with a dense structure exposed to the surface and a partition 12b dividing plural spaces. An internal space 13 surrounded by the shell 12 is usually filled with air.

In the present invention, the dense structure refers to a structure in which vacancy of several ten nm or more is not observed.

The shell 12 is formed by a resin consisting of a polymer obtained by polymerizing a polymerizable monomer (hereinafter, also referred to as the "shell resin").

A cross-sectional structure of the inside of the hollow particle can be verified, for example, by observing a cross-section by a known means such as scanning electron microscope (SEM), and the like, which cross-section is obtained by imbedding a hollow particle in a UV-cured resin, immersing the resin in liquid nitrogen and splitting the resin.

[Shell Resin]

Examples of the shell resin include styrene resins, acrylic resins, vinyl chloride resins, styrene acrylic resins and the like, which are formed using a polymerizable monomer(s). The polymerizable monomer for forming the shell resin may be used in one kind alone, or two or more kinds in combination, but desirably includes a multifunctional polymerizable monomer.

A hollowness of the hollow particle can be, for example 10 to 95% by volume.

The hollowness of the hollow particle can be controlled by adjusting a content of the hydrophobic solvent in an oil-phase liquid which will be described below.

According to one embodiment of the method for the production of a hollow particle of the present invention, for example as shown in FIG. 1, the method for the production of a hollow particle of the present invention includes:

(1) an oil-phase liquid-preparing process of dissolving or dispersing a polymerizable monomer for forming a shell resin and an oil-soluble polymerization initiator 18 in a hydrophobic solvent to prepare an oil-phase liquid, (2) an oil droplet-forming process of dispersing the oil-phase liquid in an aqueous medium 20 having a water-soluble polymerization initiator 28 and a surfactant dissolved therein to form an oil droplet 11 (FIG. 1A), (3) a polymerization process of applying the oil-soluble polymerization initiator 18 and the water-soluble polymerization initiator 28 at the same time to the polymerizable monomer and polymerizing the polymerizable monomer to form a shell 12 in a hollow particle 10 (FIG. 1B), (4) a hydrophobic solvent-removing process of removing the hydrophobic solvent 15 that is filled up into an internal space 13 of the formed hollow particle 10 and replacing the hydrophobic solvent with an aqueous medium 20 (FIG. 1C), (5) a washing process of filtering the hollow particle 10 from the aqueous medium 20, and removing a surfactant and the like from the hollow particle 10, and (6) a drying process of drying the washing-treated hollow particle 10 (FIG. 1D).

In the present invention, the aqueous medium refers to an aqueous medium consisting of 50 to 100 mass % of water, and 0 to 50 mass % of a water-soluble organic solvent. The water-soluble organic solvent is not limited unless it dissolves the shell resin, and the polymerizable monomer for forming the shell resin and the oil-soluble polymerization initiator when mixed with water to be the aqueous medium. Typically, methanol, ethanol, isopropanol, butanol, acetone, methyl ethyl ketone, tetrahydrofuran and the like can be used.

As the aqueous medium, water is preferably used because water is excellent in environmental compatibility.

(1) Oil-Phase Liquid-Preparing Process

The oil-phase liquid is prepared by dissolving or dispersing a polymerizable monomer for forming a shell resin in a hydrophobic solvent, and further adding an oil-soluble polymerization initiator thereto.

[Hydrophobic Solvent]

The hydrophobic solvent may be those having very low solubility in water, and accordingly being able to form oil droplets in an aqueous medium, and further having a boiling point higher than a polymerization temperature of polymerizable monomer for forming a shell resin. Typically, hydrocarbon compounds such as cyclohexane, cycloheptane and hexane; hydrocarbon chloride compounds such as dichloromethane; and the like can be used. These may be used in one kind alone, or two or more kinds in combination.

In addition, as the hydrophobic solvent, those having a lower boiling point than that of water is preferably used from the viewpoint that the hydrophobic solvent can be easily removed in the hydrophobic solvent-removing process.

As examples of the polymerizable monomer for forming a shell resin, a polymerizable monomer to form a shell resin in the case where a vinyl resin is used as the shell resin, includes the followings:

(1) Styrene-Based Monomer

Styrene, o-methyl styrene, m-methyl styrene, p-methyl styrene, α-methyl styrene, p-phenyl styrene, p-ethyl styrene, p-n-butyl styrene, p-tert-butyl styrene, p-n-hexyl styrene, p-n-octyl styrene, p-n-nonyl styrene, p-n-decyl styrene, p-n-dodecyl styrene, 2,4-dimethyl styrene and the like.

(2) (Meth)acrylic Acid Ester-Based Monomer

Methyl acrylate, ethyl acrylate, n-propyl acrylate, isopropyl acrylate, n-butyl acrylate, isobutyl acrylate, t-butyl acrylate, n-octyl acrylate, 2-ethylhexyl acrylate, stearyl acrylate, lauryl acrylate, phenyl acrylate, methyl methacrylate, ethyl methacrylate, n-propyl methacrylate, isopropyl methacrylate, n-butyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, dimethylaminoethyl methacrylate and the like.

(3) Olefins

Ethylene, propylene, isobutylene and the like.

(4) Vinyl Esters

Vinyl propionate, vinyl acetate, vinyl benzoate and the like.

(5) Vinyl Ethers

Vinylmethyl ether, vinylethyl ether and the like.

(6) Vinyl Ketones

Vinylmethyl ketone, vinylethyl ketone, vinylhexyl ketone and the like.

(7) N-Vinyl Compounds

N-vinyl carbazole, N-vinyl indole, N-vinyl pyrrolidone and the like.

(8) Others

Vinyl compounds such as butadiene, vinyl naphthalene and vinyl pyridine; acrylic acid or methacrylic acid derivatives such as acrylonitrile, methacrylonitrile, acrylic amide and methacrylic amide; maleic anhydride; and the like.

The polymerizable monomer for forming a shell resin preferably incorporate a cross-linking structure into the shell resin using at least a multifunctional polymerizable monomer. To be specific, the polymerizable monomer preferably comprises at least a multifunctional polymerizable monomer.

For example, in the case where the shell resin is a vinyl resin, a multifunctional vinyl monomer(s) below is preferably used as the multifunctional polymerizable monomer along with the monofunctional vinyl monomer such as the styrene-based monomers and the (meth)acrylic acid ester-based monomers described above.

(9) Multifunctional Vinyl Monomer

Divinyl benzene, dimethacrylate and trimethacrylate of tertiary or higher alcohol such as ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, hexylene glycol dimethacrylate, hexylene glycol diacrylate, pentaerythritol, trimethylol propane and the like.

By using such multifunctional polymerizable monomer, strength of a shell increases, which can suppress decrease in strength by impregnation with the hydrophobic solvent into the shell, thereby to suppress fusion of the hollow particles with each other at the time of the filtering from the aqueous medium even if the hollow particle has high hollowness.

A ratio of the multifunctional polymerizable monomer in the whole polymerizable monomer for forming a shell resin (copolymerization ratio) is, for example, 0.1 to 99 mass %, and preferably 1 to 80 mass %.

A content ratio of the polymerizable monomer for forming a shell resin in the oil-phase liquid is preferably 1 to 100 parts by mass with respect to 100 parts by mass of the hydrophobic solvent.

[Oil-Soluble Polymerization Initiator]

The oil-soluble polymerization initiator may be those being able to exhibit polymerization initiation ability at a temperature lower than a boiling point of the hydrophobic solvent. For example, azo-based or diazo-based polymerization initiators such as 2,2'-azobis-(2,4-dimethylvaleronitrile), 2,2'-azobisisobutyronitrile, 1,1'-azobis(cyclohexane-1-carbonitrile) and 2,2'-azobis-4-methoxy-2,4-dimethylvaleronitrile; peroxide-based polymerization initiators such as benzoyl peroxide, methylethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl) propane and tris-(t-butylperoxy)triazine; polymer initiators having peroxide on its side chain; and the like can be used.

These oil-soluble polymerization initiators may be used in one kind alone, or two or more kinds in combination.

An amount of the oil-soluble polymerization initiator is not particularly limited, but is preferably 0.1 to 3 mass % with respect to the polymerizable monomer, from the viewpoint of improved polymerizability of the polymerizable monomer (formability of partition).

(2) Oil Droplet-Forming Process

The oil droplet-forming process is performed specifically, for example, by adding the oil-phase liquid containing the polymerizable monomer for forming a shell resin to an aqueous medium containing a surfactant in critical micelle concentration (CMC) or lower, and further containing a water-soluble polymerization initiator, and applying mechanical energy thereto to form an oil droplet(s).

Formation of the oil droplet(s) is necessarily performed at low temperature such that radicals are not generated in the oil-soluble polymerization initiator and the water-soluble polymerization initiator, and preferably performed, for example, at room temperature.

[Surfactant]

In the case where a surfactant is contained in the aqueous medium, as the surfactant, an anion-based surfactant or a nonionic-based surfactant is preferably used.

Examples of the anion-based surfactant include sulfonic acid salts such as sodium dodecyl benzene sulfonate, sodium arylalkyl polyether sulfonate, sodium 3,3-disulfonic diphenyl urea-4,4-diazo-bis-amino-8-naphthol-6-sulfonate, ortho-carboxybenzene-azo-dimethylaniline and sodium 2,2,5,5-tetramethyl-triphenyl methane-4,4-diazo-bis-β-naphthol-6-sulfonate; sulfuric acid ester salts such as sodium dodecyl sulfate, sodium tetradecyl sulfate, sodium pentadecyl sulfate and sodium octyl sulfate; fatty acid salts such as sodium oleate, sodium laurate, sodium caprate, sodium caprylate, sodium caproate, potassium stearate and calcium oleate; and the like.

Examples of the nonionic-based surfactant may include polyethylene oxide, polypropylene oxide, combinations of polypropylene oxide with polyethylene oxide, etc., esters of polyethylene glycol and higher fatty acid, alkyl phenol polyethylene oxide, esters of higher fatty acid and polyethylene glycol, esters of higher fatty acid and polypropylene oxide, sorbitan esters and the like.

These surfactants may be used in one kind alone, or two or more kinds in combination.

In addition, instead of the surfactants described above, a substance that has protective colloid performances such as polyvinyl alcohol and polyvinyl pyrrolidone can be used.

[Water-Soluble Polymerization Initiator]

The water-soluble polymerization initiator may be those being able to exhibit polymerization initiation ability at temperature lower than a boiling point of the hydrophobic solvent. Persulfuric acid salts such as potassium persulfate, potassium peroxodisulfate and ammonium persulfate; azobisaminodipropane acetate, azobiscyanovaleric acid and a salt thereof, hydrogen peroxide and the like can be used.

These water-soluble polymerization initiators may be used in one kind alone, or two or more kinds in combination.

An amount of the water-soluble polymerization initiator is not particularly limited, but is preferably 0.1 to 5 mass % with respect to the polymerizable monomer, from the viewpoint of improved polymerizability of the polymerizable monomer (formability of partition).

A mixing ratio of the oil-soluble polymerization initiator and the water-soluble polymerization initiator also is not particularly limited. A mixing ratio of the oil-soluble polymerization initiator and the water-soluble polymerization initiator (mixing ratio (mass ratio) of the oil-soluble polymerization initiator:the water-soluble polymerization initiator) is 1:1 to 5:1, from the viewpoint of improved polymerizability of the polymerizable monomer (formability of partition).

An amount of the aqueous medium used is preferably 50 to 2,000 parts by mass with respect to 100 parts by mass of the oil-phase liquid.

By setting the amount of the aqueous medium used within the range above, it is possible to emulsify and disperse the oil-phase liquid so as to yield a desired particle diameter in the aqueous medium.

Examples of a means for providing mechanical energy include means for providing strong stirring or ultrasonic wave vibration energy such as a homomixer (emulsifying machine), ultrasonic waves and Manton-Gaulin.

An average particle diameter of the oil droplets obtained in this oil droplet-forming process is preferably, for example, in the range of 10 nm to several hundred μm as a median size on the volume basis.

(3) Polymerization Process

This process is a process of polymerizing the polymerizable monomer for forming a shell by applying an oil-soluble polymerization initiator and a water-soluble polymerization initiator at the same time to the polymerizable monomer.

In the present invention, the "applying an oil-soluble polymerization initiator and a water-soluble polymerization initiator at the same time" refers that there is overlapping time zone in the radical generation time zone of each of the oil-soluble polymerization initiator and the water-soluble polymerization initiator.

In this process, radicals in the oil-soluble polymerization initiator and the water-soluble polymerization initiator are generated by heating the reaction system. At this time, polymerization reaction at multi-points in the oil droplet and on the surface of the oil droplet is performed, to form a shell having plural spaces filled up with the hydrophobic solvent inside.

An average particle diameter of the hollow particle in the obtained dispersion of the hollow particle filled up with the hydrophobic solvent in the internal space, is preferably, for example, 10 nm to 200 μm as a median size on the volume basis.

Meanwhile, the median size on the volume basis is a value measured using "LA-750" (manufactured by HORIBA, Ltd).

According to the method for the production of a hollow particle of the present invention, by applying an oil-soluble polymerization initiator and a water-soluble polymerization initiator at the same time to polymerizable monomer in oil droplets and polymerizing the polymerizable monomer, surface wall and partition(s) are formed simultaneously, and accordingly a shell(s) dividing plural spaces is formed, and this makes it possible to easily produce hollow particle having plural spaces formed inside thereof.

Polymerization conditions are not particularly limited, and can be suitably selected depending on melting point or boiling point of hydrophobic solvent or aqueous medium to be used, kind and amount of polymerizable monomer, oil-soluble polymerization initiator, and water-soluble polymerization initiator to be used and the like. For example, a polymerization temperature is preferably 20 to 90° C. A polymerization time is preferably 2 to 20 hours. By the conditions, the polymerizable monomer can be efficiently polymerized. Prior to the polymerization, a mixture containing a polymerizable monomer, an oil-soluble polymerization initiator, a water-soluble polymerization initiator and the like may be stirred at about 10 to 30° C. for about 5 to 60 minutes.

(4) Hydrophobic Solvent-Removing Process

This process is a process of removing the hydrophobic solvent that is filled up into the formed internal space of the hollow particle and replacing the hydrophobic solvent with an aqueous medium. Preferably, the polymerizable monomer is polymerized in an aqueous medium, and then the hydrophobic solvent filled up into the space is replaced with the aqueous medium, and then dried. The hydrophobic solvent-removing process may be carried out at the same time of or after the polymerization process.

Removal of the hydrophobic solvent can be performed by stirring under air stream, the whole dispersion in which the hollow particle filled up with the hydrophobic solvent in the internal space are dispersed in the aqueous medium. In addition, the whole dispersion may be heated to a temperature lower than a boiling point of the hydrophobic solvent. In addition, the whole dispersion may be stirred under reduced pressure. In the case where the hydrophobic solvent can be subjected to steam distillation like toluene, the hydrophobic solvent may be removed by steam distillation.

Meanwhile, if removal of the hydrophobic solvent is not performed when the hollow particle(s) filled up with the hydrophobic solvent in the internal space is isolated from the aqueous medium, defects occur such that the shell of the hollow particle is swollen with the hydrophobic solvent, and the hydrophobic solvent is exuded while being compatible with the shell, thereby to crush the hollow particle(s).

The conditions for removing hydrophobic solvent are not particularly limited and can be suitably selected depending on scale, solubility or volatility of hydrophobic solvent and the like. For example, a polymerized product may be dried at about 10 to 30° C. for about 5 to 48 hours. By the conditions, the hydrophobic solvent and aqueous medium are mixed via a partition mutually, and the hydrophobic solvent are vaporized and discharged out of a particle to efficiently attain replacement with the aqueous medium.

As described above, by once replacing the hydrophobic solvent filled up into the internal space of the hollow particle with the aqueous medium, it is possible to suppress decrease in strength of shell due to impregnation of the hydrophobic solvent into the shell, and thus to suppress fusion of the hollow particles with each other at the time of the filtration from the aqueous medium even if the hollow particles have high hollowness.

(5) Washing Process

In this process, solid-liquid isolation treatment of solid-liquid isolating the dispersion of the hollow particle is performed, and attached matters such as a surfactant is removed from the aggregate of flocculation of the hollow particles that are formed by solid-liquid isolation and are in the wet state. Representative examples of the solid-liquid isolation treatment include filtration treatment, and as specific method of the filtration treatment, for example, centrifugal separation method, reduced pressure-filtration method by use of Nutsche, etc., filtration method using a filter press, etc., and the like can be used.

(6) Drying Process

In this process, dry treatment of the washing-treated hollow particles is performed. Examples of a drier that can be used in this process include known dry treatment machines such as a spray dryer, a vacuum freezing drier and a reduced-pressure drier, a standing shelf drier, a moving-type shelf drier, a fluidized bed drier, a rotation-type drier, a stirring-type drier and the like. A water content of the dry-treated hollow particles is preferably 5 mass % or less, and more preferably 2 mass % or less.

In addition, in the case where the dry-treated hollow particles form an aggregate by aggregation with weak attraction between the particles with each other, the aggregate is preferably treated with crushing. Typical examples of the crushing treatment device include mechanical-type crushing treatment devices such as a jet mill, a Henschel mixer, a coffee mill and a food processor.

[Average Particle Diameter of Hollow Particle]

An average particle diameter of the hollow particle according to the present invention may be set to, for example, 0.01 to 200 μm as a median size on the volume basis. This particle diameter can be controlled by adjusting a size of the oil droplet.

The median size of the hollow particle on the volume basis can be measured using "LA-750" (manufactured by HORIBA, Ltd). For example, specifically, the median size of the hollow particle on the volume basis can be measured for a sample, which is a dispersion obtained by adding 0.2 g of the hollow particles to 20 ml of an aqueous solution of a surfactant (a surfactant solution obtained by, for example, diluting a neutral detergent containing a surfactant ingredient by 10 folds with pure water for the purpose of dispersion of the hollow particles), and performing ultrasonic wave dispersion for 3 minutes.

The hollow particle described above can be used as, for example, a heat insulating material, a whitening agent, a weight-saving agent or a soundproof material.

Although the embodiments of the present invention are specifically illustrated above, the embodiments of the present invention are not limited to the examples above, but various modifications can be applied.

EXAMPLES

Hereinafter, specific Examples of the present invention are illustrated, but the present invention is not limited to these Examples. Unless specifically stated, each operation is carried out at room temperature (25° C.)

Example 1: Preparation Example 1 of Hollow Particle 55 g of styrene, 2.7 g of neopentyl glycol dimethacrylate and 0.44 g of azobisisobutyronitrile were mixed and dissolved in 57.7 g of cyclohexane, and 422 g of ion-exchanged water, 0.0253 g of sodium lauryl sulfate and 0.73 g of potassium peroxodisulfate were added thereto. This was dispersed for 6 minutes at 10,000 rpm with an emulsifying machine "CLEARMIX" (manufactured by M Technique Co., Ltd.), to prepare an emulsion.

The resultant emulsion was put into a separable flask set with a stirring device, a water-cooling reflux tube and a nitrogen introduction tube, and stirred for 20 minutes at room temperature with continuous stirring and introduction of nitrogen, and then heated to 70° C., and kept at 70° C. for 12 hours, and then cooled to room temperature, and kept at room temperature for 12 hours.

Figure 2:
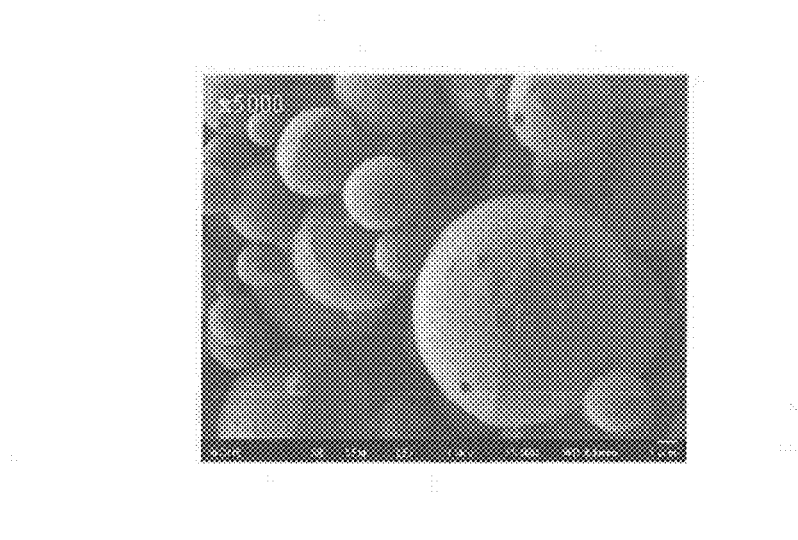
FIG. 2 is a SEM photograph that shows a surface of the hollow particles according to Example 1.
Figure 3:
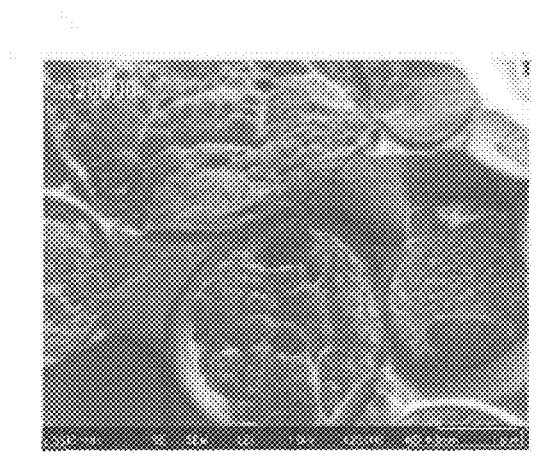
FIG. 3 is a SEM photograph that shows a cross-section of the hollow particles according to Example 1.

Then, the resultant was washed using suction-filtration and ion-exchanged water, and spread on a tray and dried at 40° C., to obtain a white solid [1]. The resultant white solid [1] was easily collapsed. The collapsed white solid [1] was observed with a scanning electron microscope as it was, to observe particles having a dense shell on the surface. This is shown in the SEM photograph of FIG. 2. In addition, the collapsed white solid [1] was imbedded in a UV-cured resin, immersed in liquid nitrogen and sliced, and the cross-section was observed with a scanning electron microscope, to observe that the cross-section did not have a single spherical space, but had plural spaces inside thereof. This is shown in SEM photograph of FIG. 3.

Example 2: Preparation Example 2 of Hollow Particle

A white solid [2] was obtained in the same manner as Example 1: Preparation Example 1 of the hollow particle, except that neopentyl glycol dimethacrylate was not used. The resultant white solid [2] was somewhat hardly collapsed. The white solid [2] was observed with an optical microscope, to observe partial fusion of the particles. In addition, collapsed white solid [2] was imbedded in a UV-cured resin, immersed in liquid nitrogen and sliced. The cross-section was observed with a scanning electron microscope, to observe that the hollow particles had a dense shell on the surface, and did not have a single spherical space, but had plural spaces.

Example 3: Preparation Example 3 of Hollow Particle

A white solid [3] was obtained in the same manner as Example 1: Preparation Example 1 of the hollow particle, except that the processes of cooling to room temperature, and then keeping at room temperature for 12 hours were omitted. The resultant white solid [3] was somewhat hardly collapsed. The white solid [3] was observed with an optical microscope, to observe partial fusion of the particles. In addition, the collapsed white solid [3] was imbedded in a UV-cured resin, immersed in liquid nitrogen and sliced. The cross-section was observed with a scanning electron microscope, to observe that the hollow particles had a dense shell on the surface, and did not have a single spherical space, but had plural spaces.

Comparative Example 1: Preparation Example 4 of Hollow Particle

A white solid [4] was obtained in the same manner as Example 1: Preparation Example 1 of the hollow particle, except that azobisisobutyronitrile was not used. The resultant white solid [4] was collapsed, imbedded in a UV-cured resin, immersed in liquid nitrogen and sliced. The cross-section was observed with a scanning electron microscope, to observe that the hollow particles had a dense shell on the surface, but had a single spherical space inside.

Comparative Example 2: Preparation Example 5 of Hollow Particle

A white solid [5] was obtained in the same manner as Example 1: Preparation Example 1 of the hollow particle, except that potassium peroxodisulfate was not used. The resultant white solid [5] was decomposed, imbedded in a UV-cured resin, immersed in liquid nitrogen and sliced. The cross-section was observed with a scanning electron microscope, to observe that the hollow particles had a no-dense shell on the surface.

REFERENCE SIGNS LIST

10 Hollow particle
11 Oil droplet
12 Shell
12a Surface wall
12b Partition
13 Internal space
15 Hydrophobic solvent
18 Oil-soluble polymerization initiator
20 Aqueous medium
28 Water-soluble polymerization initiator

What is claimed is:

1. A method for a production of a hollow particle, the method comprising:
   forming an oil droplet in a first aqueous medium by dispersing an oil-phase liquid in the first aqueous medium, wherein the oil-phase liquid comprises a hydrophobic solvent, a polymerizable monomer, and an oil-soluble polymerization initiator having a polymerization initiation ability for the polymerizable monomer and the aqueous medium comprises water and a water-soluble polymerization initiator having a polymerization initiation ability for the polymerizable monomer;
   forming a particle in the first aqueous medium by polymerizing the polymerizable monomer with the oil-soluble polymerization initiator and the water-soluble polymerization initiator at the same time such that the particle is formed with a shell that has a surface wall and a partition inside the shell, wherein a space is formed inside the shell when polymerizing the polymerizable monomer, and the space contains the hydrophobic solvent; and replacing the hydrophobic solvent in the space with a second aqueous medium, and drying the particle to make the hollow particle.

2. The method for the production of the hollow particle according to claim 1, wherein the polymerizable monomer includes at least a multifunctional polymerizable monomer.

3. The method for the production of the hollow particle according to claim 1, wherein the surface wall and the partition of the shell are made of a same composition.

4. The method for the production of the hollow particle according to claim 1, wherein the shell comprises a resin selected from the group consisting of styrene resins, acrylic resins, vinyl chloride resins, and styrene acrylic resins.

5. The method for the production of the hollow particle according to claim 1, wherein the oil-soluble polymerization initiator is selected from the group consisting of an azo-based polymerization initiator, a diazo-based polymerization initiator, and a polymerization initiator having a peroxide.

6. The method for the production of the hollow particle according to claim 1, wherein the hydrophobic solvent is not polymerizable.

7. The method for the production of the hollow particle according to claim 1, wherein the hydrophobic solvent is selected from the group consisting of hydrocarbon compound and hydrocarbon chloride compound.

8. The method for the production of the hollow particle according to claim 1, wherein the water-soluble polymerization initiator is selected from the group consisting of persulfuric acid salt, azobisaminodipropane acetate, azobiscyanovaleric acid, and hydrogen peroxide.

9. The method for the production of the hollow particle according to claim 1, wherein
the first aqueous medium and the second aqueous medium are the same.

10. The method for the production of the hollow particle according to claim 1, wherein the hollow particle has a hollowness of 10 to 98% by volume.

11. The method for the production of the hollow particle according to claim 1, wherein an average diameter of the hollow particle is 10 nm to 200 μm as a median size on a volume basis.

12. A method for a production of a hollow particle having plural spaces inside thereof, the method comprising:

forming an oil droplet in an aqueous medium by dispersing an oil-phase liquid in the aqueous medium, wherein the oil-phase liquid comprises a hydrophobic solvent, a polymerizable monomer, and an oil-soluble polymerization initiator having a polymerization initiation ability for the polymerizable monomer, and the aqueous medium comprises water and a water-soluble polymerization initiator having a polymerization initiation ability for the polymerizable monomer;

forming a particle in the aqueous medium by polymerizing the polymerizable monomer with the oil-soluble polymerization initiator and the water-soluble polymerization initiator at the same time such that the particle is formed with a shell dividing plural spaces inside the particle, wherein the spaces contain the hydrophobic solvent;

replacing the hydrophobic solvent in the spaces with the aqueous medium; and drying the particle.

* * * * *